United States Patent
Cleghorn et al.

(10) Patent No.: US 8,816,198 B1
(45) Date of Patent: *Aug. 26, 2014

(54) STACKABLE AND COLLAPSIBLE ELECTRICAL BOX

(75) Inventors: Richard L. Cleghorn, Tempe, AZ (US); Jeffrey P. Baldwin, Phoenix, AZ (US); Iven Dieterle, Tempe, AZ (US); Marcus J. Shotey, Scottsdale, AZ (US)

(73) Assignee: Hubbell Incorporated, Shelton, CT (US)

( * ) Notice: Subject to any disclaimer, the term of this patent is extended or adjusted under 35 U.S.C. 154(b) by 178 days.

This patent is subject to a terminal disclaimer.

(21) Appl. No.: 13/596,648

(22) Filed: Aug. 28, 2012

Related U.S. Application Data (63) Continuation of application No. 12/789,383, filed on May 27, 2010, now Pat. No. 8,253,017.

(60) Provisional application No. 61/181,476, filed on May 27, 2009.

(51) Int. Cl.
*H05K 5/00* (2006.01)

(52) U.S. Cl.
USPC ............... 174/50; 439/535; 248/906; 174/58; 174/64

(58) Field of Classification Search
USPC ............... 174/50, 58, 64; 439/535; 220/4.02; 248/906
See application file for complete search history.

(56) References Cited

U.S. PATENT DOCUMENTS

| | | |
|---|---|---|
| 2,378,861 A | 6/1945 | Peevey |
| 2,458,153 A | 1/1949 | Festge |
| 2,875,915 A | 3/1959 | Buckels |
| 2,916,733 A | 12/1959 | Hirsch |
| 3,449,706 A | 6/1969 | Carissimi |
| 3,622,029 A | 11/1971 | Ware |
| 4,634,015 A | 1/1987 | Taylor |
| 4,794,207 A * | 12/1988 | Norberg et al. ............... 174/505 |
| 4,803,307 A | 2/1989 | Shotey |
| 4,988,832 A | 1/1991 | Shotey |
| 5,042,673 A | 8/1991 | McShane |
| 5,527,993 A | 6/1996 | Shotey et al. |
| 5,562,222 A | 10/1996 | Jordan et al. |
| 5,763,831 A | 6/1998 | Shotey et al. |
| 5,773,760 A | 6/1998 | Stark et al. |
| 5,931,325 A | 8/1999 | Filipov |
| 6,133,531 A | 10/2000 | Hayduke et al. |
| 6,441,307 B1 | 8/2002 | Shotey et al. |
| 6,476,321 B1 | 11/2002 | Shotey et al. |
| 6,723,922 B1 | 4/2004 | Shotey et al. |
| 6,737,576 B1 | 5/2004 | Dinh |
| 6,761,582 B1 | 7/2004 | Shotey et al. |
| 6,770,816 B2 | 8/2004 | Shotey et al. |
| 6,820,760 B2 | 11/2004 | Wegner et al. |

(Continued)

*Primary Examiner* — Dhirubhai R Patel (74) *Attorney, Agent, or Firm* — Garrett V. Davis; Mark S. Bicks; Alfred N. Goodman (57) ABSTRACT

An electrical box has a back portion with a back wall and various side walls. Coupled to the back portion is a sliding ring portion having various side walls. The sliding ring portion is slidably mounted on the back portion such that there is an extended position with a first depth and a collapsed position with a second depth where the first depth is greater than the second depth. Prior to installation, the electrical box would be in the collapsed position in order to minimize the space occupied by the electrical box. When installed, the electrical box would be used in the extended position, such that the full depth of the electrical box can be used.

20 Claims, 7 Drawing Sheets

(56) References Cited

U.S. PATENT DOCUMENTS

| | | |
|---|---|---|
| 6,894,223 B1 | 5/2005 | Shotey et al. |
| 6,979,777 B2 | 12/2005 | Marcou et al. |
| 6,987,225 B2 | 1/2006 | Shotey et al. |
| 7,038,131 B1 | 5/2006 | Gretz |
| 7,109,419 B1 | 9/2006 | Gretz |
| 7,259,328 B1 | 8/2007 | Gretz |
| 7,374,058 B2 | 5/2008 | Dinh et al. |
| 2005/0197019 A1 | 9/2005 | Maltby et al. |

* cited by examiner

STACKABLE AND COLLAPSIBLE ELECTRICAL BOX

CROSS REFERENCE TO RELATED APPLICATIONS

This application is a continuation of U.S. application Ser. No. 12/789,383, now U.S. Pat. No. 8,251,017, entitled "Stackable and Collapsible Electrical Box" to Richard Cleghorn et al. which was filed May 27, 2010, which claims the benefit of the filing date of U.S. Provisional Patent Application 61/181,476, entitled "Space Saving Electrical Box" to Richard Cleghorn, et al. which was filed on May 27, 2009, the contents of which are hereby incorporated herein by reference.

BACKGROUND

1. Technical Field

Aspects of this document relate generally to electrical boxes.

2. Background Art

Electrical boxes are conventionally used to mount and house one or more electrical devices within a wall or other structure. Such conventional electrical boxes typically consist of a generally box-shaped structure that is mounted to a wall stud or other interior wall structure via one or more nails, screws, or other fastening devices. An electrical box is typically a one-piece structure and contains an opening for an electrical device or connector which is typically installed within the box after the box is mounted within a wall.

One problem with current electrical boxes is the transport of electrical boxes. As a result of the structural features on many electrical boxes necessary for them to operate as electrical boxes to attach to the structural supports within a wall, storage and transport of the electrical boxes is cumbersome and takes up a lot of space. It would be desirable to increase the shipping density (the number of electrical boxes that can fit in a given amount of space) by minimizing the space between electrical boxes.

SUMMARY

Aspects of this document relate to collapsible electrical boxes. In a first aspect, an electrical box assembly may comprise a back portion comprising at least four sides extending forward from a back wall to an open front, a sliding ring portion comprising at least four side walls extending between an open front and an open back of the sliding ring portion, the sliding ring portion slidably coupled to the back portion through portions of at least two of its at least four sides, at least one wall mounting structure connected directly to at least one side wall of the back portion or the sliding ring portion, at least two box mounting screw apertures adjacent to each of at least two sides of the sliding ring portion, each box mounting screw aperture comprising an opening extending toward the open front of the sliding ring portion; wherein the electrical box assembly includes a first depth in an expanded position and a second depth in a collapsed position and wherein the first depth is greater than the second depth.

In particular implementations an electrical box assembly may comprise one or more of the following features. The second depth may be approximately two-thirds of the first depth. The back portion may be sized such that a portion of the back portion is smaller than the open front of the back portion and the open front of the sliding ring portion so that a portion of the electrical box assembly may be nested within the open front of the back portion of another similarly configured electrical box assembly. The sliding ring portion may be slidably mounted to the back portion on an external wall surface of the back portion. The at least one wall mounting structure may be integral with the sliding ring portion. The electrical box assembly may not include any wall mounting structures other than those integral with the sliding ring portion. The electrical box assembly may further comprise a locking tab coupled to the back portion, wherein the locking tab is configured to resist movement of the sliding ring portion from the extended position.

At least one of the side walls of the back portion may comprise at least one notch on a front edge of the at least one of the side walls of the back portion to form a grip space such that when the sliding ring portion is slid to its collapsed position the side walls of the sliding ring portion are enclosed by the side walls of the back wall portion except for the at least one portion of the sliding ring exposed by the at least one notch. The back portion may further comprise at least one track on an internal surface of the back portion, the sliding ring portion may further comprise at least one corresponding track on an external surface of the sliding ring portion, and wherein the back portion and the sliding ring portion may be slidably coupled through the respective corresponding tracks. The at least one wall mounting structure may be connected to the electrical box assembly such that when the sliding ring portion is slid from the expanded position to the collapsed position, the at least one wall mounting structure moves in relation to the back portion. The sliding ring portion may be slidably mounted to the back portion on an external surface of the back portion. The back portion may further comprise at least one track on an external surface of the back portion, the sliding ring portion may further comprise at least one corresponding track on an internal surface of the sliding ring portion, and wherein the back portion and the sliding ring portion may be slidably coupled through the respective corresponding tracks. The back portion may be sized such that a portion of the back portion is smaller than the open front of the back portion and the open front of the sliding ring portion so that a portion of the electrical box assembly may be nested within the open front of the back portion of another similarly configured electrical box assembly.

In another aspect, a system of electrical boxes may comprise first and second collapsible electrical boxes each comprising a back portion comprising at least four sides extending from a back wall to an open front of the back portion, a sliding ring portion comprising at least four side walls extending between an open front and an open back of the sliding ring portion, the sliding ring portion slidably coupled to the back portion through portions of at least two of its at least four sides, at least one wall mounting structure connected directly to at least one side wall of the back portion or the sliding ring portion, at least two box mounting screw apertures adjacent to each of at least two sides of the sliding ring portion, each box mounting screw aperture comprising an opening extending toward the open front of the sliding ring portion; wherein the back wall of the back portion of each of the first and second collapsible electrical boxes is sized smaller than the open front of the back portion such that the first collapsible electrical box is capable of nesting within the second electrical box and the second electrical box is capable of nesting within the first electrical box.

In particular implementations a system of electrical boxes may comprise one or more of the following features. The sliding ring portions of each of the first and second collapsible electrical boxes may be slidably mounted to the back portion on an external wall surface of the respective back portion. The at least one wall mounting structure of each of the first and second collapsible electrical boxes may be integral with the respective sliding ring portion. The at least one wall mounting structure may be connected to the electrical box assembly such that when the sliding ring portion is slid from the expanded position to the collapsed position, the at least one wall mounting structure moves in relation to the back portion. The sliding ring portion of each of the first and second collapsible electrical boxes may be slidably mounted to the back portion on an external surface of the respective back portion. The back portion of each of the first and second collapsible electrical boxes may further comprise at least one track on an external surface of the respective back portion, the sliding ring portion of each of the first and second collapsible electrical boxes may further comprise at least one corresponding track on an internal surface of the respective sliding ring portion, and the back portion and the sliding ring portions of each of the first and second collapsible electrical boxes may be slidably coupled through the respective corresponding tracks.

In another aspect, a method of stacking collapsible electrical boxes may comprise providing a plurality of electrical boxes each comprising a back portion comprising a back wall and a plurality of side walls extending from the back wall to an open front of the back portion and a sliding ring portion comprising a plurality of side walls extending between an open front and an open back of the sliding ring portion, the sliding ring portion slidably coupled to the back portion through portions of at least two of its plurality of side walls, positioning the sliding ring portion of each of the electrical boxes in a collapsed position wherein the open front of the back portion and the open front of the sliding ring portion are substantially planar with each other, and nesting a first electrical box of the plurality of electrical boxes into a second electrical box of the plurality of electrical boxes by positioning the back wall of the first electrical box in its collapsed position into the open front of both the sliding ring portion and the back portion of the second electrical box in its collapsed position.

In particular implementations of a method of stacking collapsible electrical boxes, the method may further comprise nesting at least a third electrical box of the plurality of electrical boxes in its collapsed position into the second electrical box by positioning the back wall of the third electrical box into the open front of the second electrical box and nesting at least a fourth electrical box of the plurality of electrical boxes into the third electrical box by positioning the back wall of the fourth electrical box into the open front of the third electrical box.

Aspects and applications of the disclosure presented here are described below in the drawings and detailed description. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

The electrical boxes will hereinafter be described in conjunction with the appended drawings, where like designations denote like elements, and.

DESCRIPTION

This disclosure, its aspects and implementations, are not limited to the specific components or assembly procedures disclosed herein. Many additional components and assembly procedures known in the art consistent with the intended operation and assembly procedures for an electrical box will become apparent for use with implementations of an electrical box from this disclosure. Accordingly, for example, although particular components are disclosed, such components and other implementing components may comprise any shape, size, style, type, model, version, measurement, concentration, material, quantity, and/or the like as is known in the art for such implementing components, consistent with the intended operation of an electrical box.

Referring to FIGS. 1-4, in one particular implementation, an electrical box 100 comprises a back portion 110, comprising a back wall 135, a plurality of side walls 104 and at least one wall structure mounting feature 112, 114, such as nail boss 112, 114, and a sliding ring portion 120 that is slidably coupled to back portion 110. In typical use, electrical box 100 is mounted to a wooden or metal stud or other portion within a building wall using mounting elements 112 and 114, which are coupled to back portion 110.

Back portion 110 comprises a back wall 135 and four side walls 104 that extend from the back wall 135 in the proximal direction from the back wall. The four side walls 104 form an interior space 140 that can be used to house an electrical device such as a switch or electrical receptacle and wiring for use in electrical box 100. Sliding ring portion 120 comprises four walls 106 coupled to each other. In this particular implementation, sliding ring portion 120 is sized and shaped such that sliding ring portion 120 can slide over at least part of back portion 110. Sliding ring portion 120 is configured to slide relative to back portion 110 on an axis perpendicular to the back wall 135 of back portion 110.

Figure 1:
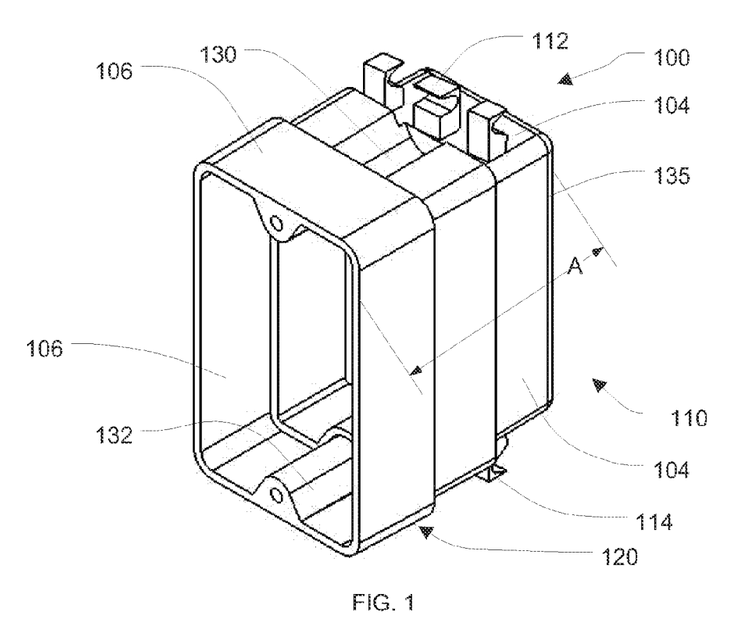
FIG. 1 is an isometric view of one implementation of an electrical box.
Figure 2:
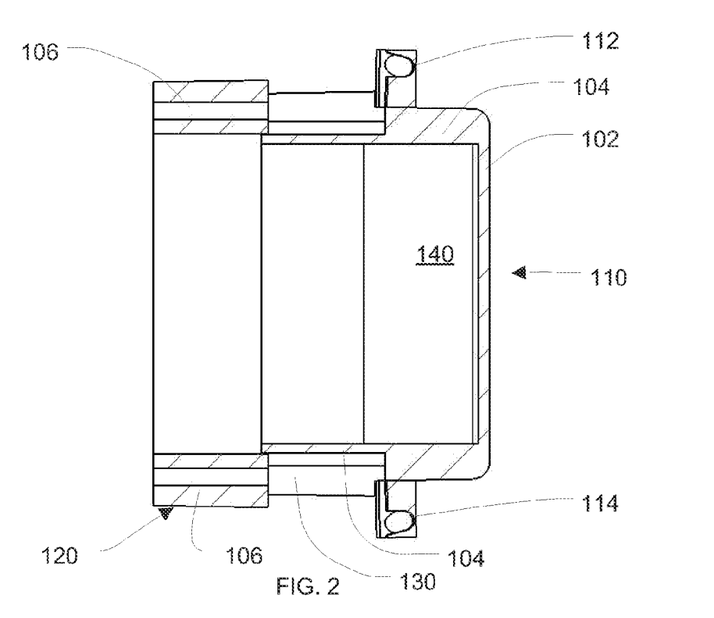
FIG. 2 is a sectional view of the electrical box of FIG. 1 in an extended position.
Figure 4:
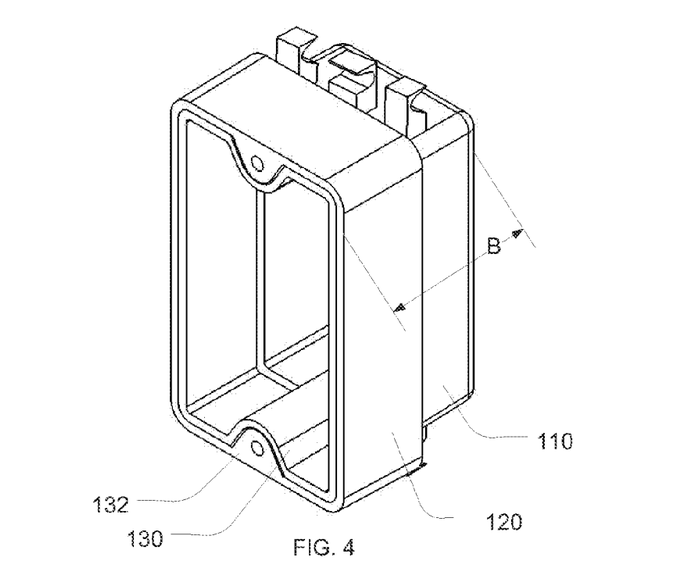
FIG. 4 is an isometric view of the electrical box of FIG. 1 in a collapsed position.

Sliding ring portion 120 has two primary positions with respect to back portion 110, an extended position with a depth A, shown in isometric view in FIG. 1, and a collapsed position with a depth B, shown in isometric view in FIG. 4. Depth A is greater than depth B. Depth A is comparable to the depth of electrical boxes now known in the art, such that when the electrical box is installed, in the extended position, the functionality of electrical box 100 is unaffected by the collapsibility.

The coupling between back portion 110 and sliding ring portion 120 may be accomplished in any manner known in the art. For example, as illustrated in FIGS. 1-4, there may be one or more tracks 130 formed on back portion 110. The tracks may comprise a groove, channel, furrow, path, ledge, raised track, and/or the like and may be formed integrally or may be formed separately and thereafter coupled to the back portion 110. These tracks 130 may be in mechanical cooperation with one or more guides 132 that are located on the inside surface of sliding ring portion 120. The guides 132 may comprise any projection, protrusion, bump, raised portion, angle, and/or the like and may be formed integrally or may be formed separately and thereafter coupled to the sliding ring portion 120. In embodiments where the sliding ring portion 120 is slidably engaged within the back portion 110, the guides 132 and tracks 130 would of course be respectively reconfigured to the appropriate surfaces of the respective back portion 110 and sliding ring portion 120.

Electrical box 100 may also include a mechanism to secure sliding ring portion 120 in a particular position. For example, a locking tab, divot, projection or other structure within or adjacent to track 130 may be configured to lock sliding ring portion in or restrict the sliding ring portion's 120 movement from the extended position. Locking tab may constructed out of the same material as back portion 110 and, in particular implementations, may be constructed in a spring loaded manner. When a spring loaded locking feature is used and sliding ring 120 is overlapping locking tab, locking tab is in a down position. When sliding ring 120 is pulled to the extended position, locking tab springs to an up position to restrict the sliding ring's 120 movement from the extended position unless the locking tab is depressed.

Figure 3:
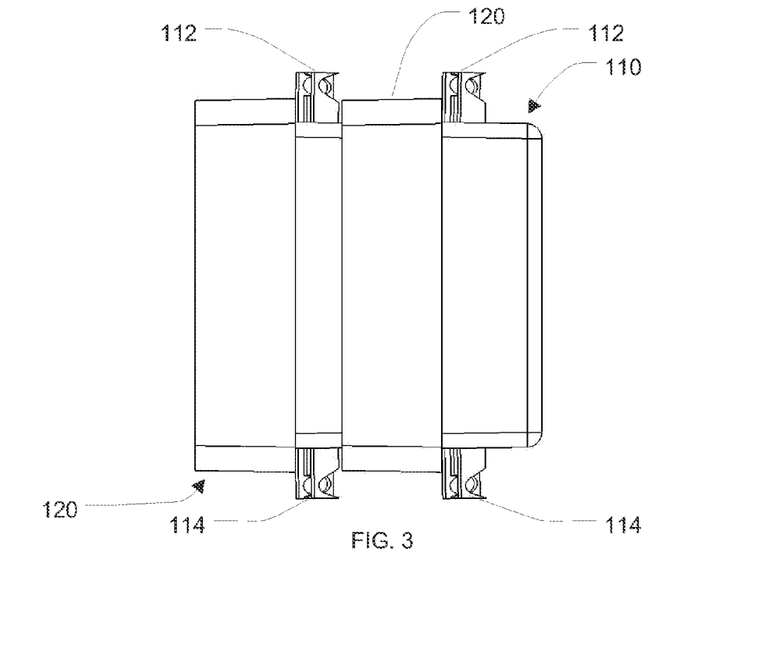
FIG. 3 is a side view of two electrical boxes of FIG. 1 nested together, each in collapsed positions.

Once in the collapsed position, an electrical box can be stacked inside another electrical box. This is illustrated in FIG. 3. On the right side of FIG. 3 is a back portion 110 of a first electrical box. Coupled to back portion 110 are mounting elements 112 and 114. Slidably mounted on back portion 110 is sliding ring portion 120 in a collapsed position. Placed within the sliding ring portion 120 and the back portion 110 of the first electrical box is the back portion 110 (not shown) of a second electrical box. Coupled to back portion 110 of the second electrical box are mounting elements 112 and 114. Slidably mounted to the back portion of the second electrical box is its sliding ring portion 120 of the second electrical box.

Before installation, electrical box 100 would typically be stored and/or transported in the collapsed position with depth B, often in nesting relationship with a plurality of electrical boxes 100. In this manner, electrical box 100 will occupy less space than typical electrical boxes, which are restricted to a fixed depth closer to depth A. Thus, more electrical boxes can be stored or transported in a given amount of space, and even a single electrical box can be stored and transported in a smaller space than was conventionally possible. It follows that the same number of electrical boxes can be stored or transported in a smaller space than if the electrical box could not be collapsed. Before electrical box 100 is to be mounted within a wall, electrical box 100 may be moved to the extended position with depth A, where it will occupy the same amount of space as a typical electrical box. Thus, there is no loss in functionality due to the collapsible feature. Thereafter, electrical box 100 is mounted using nails, screws, or the like. At this point, electrical box 100 is used in a manner known in the art—e.g., mounting electrical devices such as outlets, switches, dimmers, ceiling fans, lamps, lights, chandeliers, and the like and connecting the electrical device to wiring to form an electrical circuit.

It is readily apparent that the collapsible, nested electrical boxes shown in FIG. 3 occupy much less space than traditional electrical boxes would. Nearly two electrical boxes will occupy approximately the same amount of space as one traditional electrical box, meaning that approximately twice as many electrical boxes may be able to be placed in a box intended for shipment.

Figure 7:
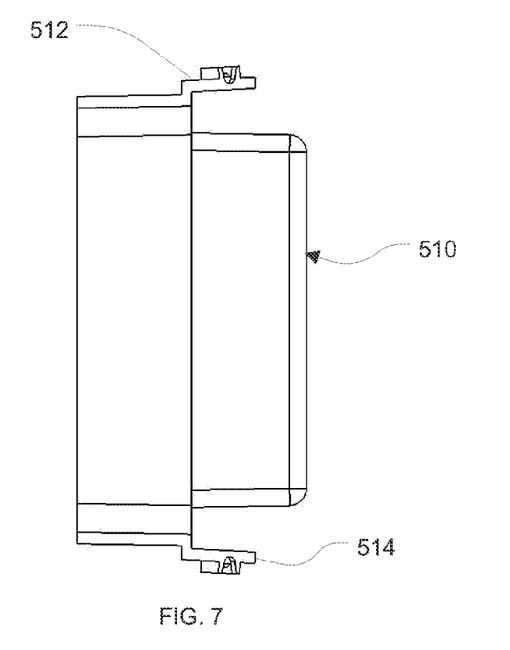
FIG. 7 is a side view of the electrical box of FIG. 5 in an extended position.
Figure 8:
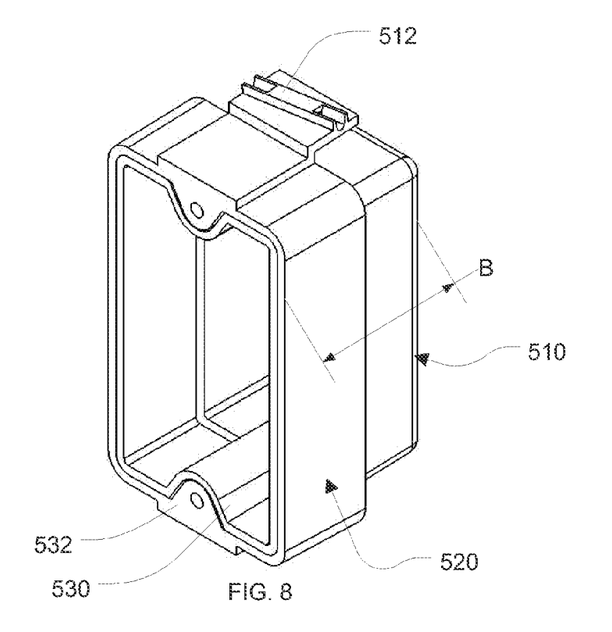
FIG. 8 is a is an isometric view of the electrical box of FIG. 5 in a collapsed position.
Figure 9:
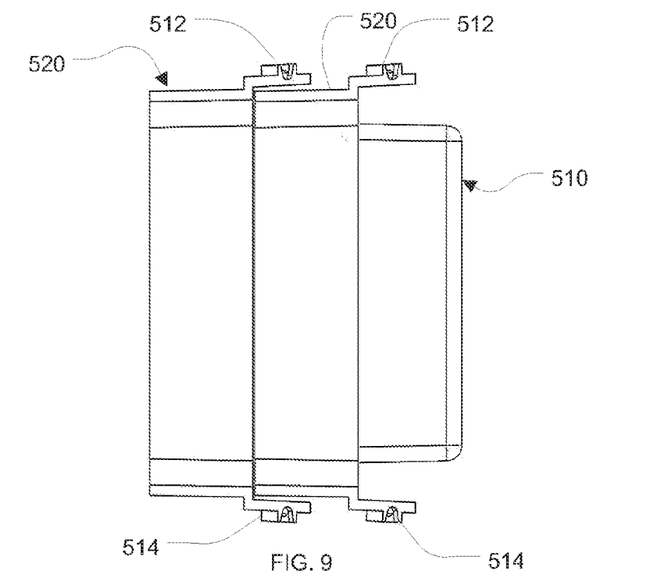
FIG. 9 is a side view of two electrical boxes of FIG. 5 nested together, each in collapsed positions.

Another embodiment is illustrated in FIGS. 7-9. This embodiment shares several characteristics with the embodiment shown in FIGS. 1 to 4. An electrical box 500 comprises a back portion 510 and an sliding ring portion 520 that is slidably coupled to back portion 510. Like the previous embodiment, back portion 510 comprises a back wall and side walls. Reference to the embodiment of FIGS. 1-4 may be referenced for the parts and operation of an electrical box including the locking features guides 532, tracks 530, all of which may be included within this present embodiment as well. Different from the prior embodiment, however, this embodiment comprises stud mounting elements 512 and 514 which are included as supports 512 and 514 extending from the sliding ring portion 520. In typical use, electrical box 500 is mounted to a wall stud using mounting elements 512 and 514.

In other respects, the embodiment shown in FIGS. 7-9 is constructed and used in a similar manner as the embodiment described with reference to FIGS. 1-4. Back portion 510 comprises a back wall 535 and four walls 504 that extend from the back wall 535 in the proximal direction from the back face. The four walls 504 form an interior space 540 that can be used to mount one or more electrical devices and wiring for use in electrical box 500. Sliding ring portion 520 comprises four walls 506 coupled to each other. Sliding ring portion 520 is sized and shaped such that sliding ring portion 520 can slide over at least part of back portion 510. Sliding ring portion 520 is configured to slide relative to back portion 510 on an axis perpendicular to the back wall 535 of back portion 510.

Figure 5:
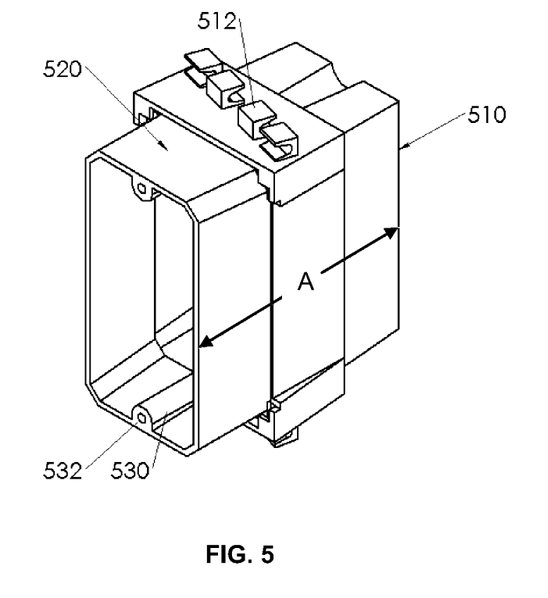
FIG. 5 is an isometric view of another implementation of an electrical box in an extended position.

Like the embodiment of FIGS. 1-4, sliding ring portion 520 has two main positions with respect to back portion 510, an extended position with a depth A, shown in isometric view in FIG. 5, and a collapsed position with a depth B, shown in isometric view in FIG. 8. Depth A is greater than depth B. Depth A is comparable to the depth of electrical boxes now known in the art, such that, when the electrical box is installed, in the extended position, the functionality of electrical box 500 is unaffected by the collapsibility.

It is anticipated that coupling the sliding ring portion 520 to the back portion 510 of this embodiment will be done the same as that in the embodiment of FIGS. 1-4 using guides 530 and tracks 532. The previous disclosure in this regard, including the description of the locking tabs and related options, all relating to the embodiment of FIGS. 1-4 applies equally to this feature of the present embodiment.

Once in the collapsed position, an electrical box 500 may be stacked inside another electrical box as shown in FIG. 9. On the right side of FIG. 9 is a back portion 510 of a first electrical box. Slidably coupled to back portion 510 is sliding ring portion 520 with its integrated mounting elements 512 and 514. Placed within the sliding ring portion 520 and the back portion 510 of the first electrical box is the back portion 510 of a second electrical box (not visible). Slidably mounted to this back portion 510 is the sliding ring portion 520 of the second electrical box with its integrated mounting elements 512 and 514.

Like with the particular embodiment of FIGS. 1-4, the particular embodiment of FIGS. 5-9 also stores in a more compact fashion than conventional electrical boxes. Installation and applicability of this embodiment is the same as the previous embodiment except that the mounting elements are part of the sliding ring portion 520 rather than the back portion 510.

Figure 6:
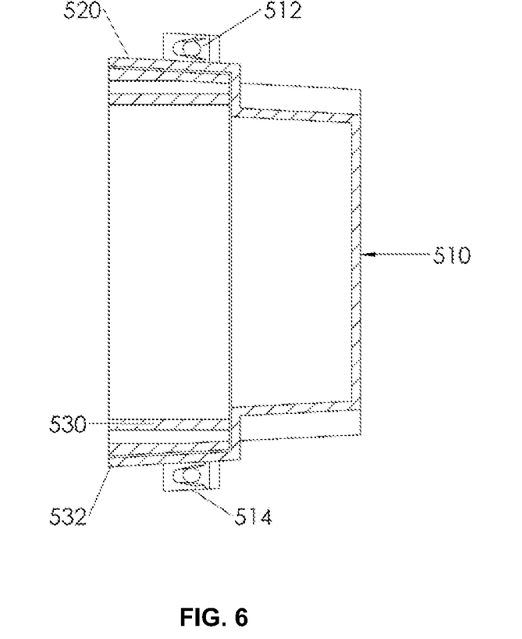
FIG. 6 is a sectional view of the electrical box of FIG. 5 in an extended position.

Another embodiment is illustrated in FIGS. 5-6. An electrical box comprises a back portion 510 and a sliding ring portion 520 that is slidably coupled to back portion 510. In typical use, electrical box is mounted to a wooden or metal wall stud using mounting elements 512 and 514, which are coupled to back surrounded by a mounting screw aperture wall 530.

Another embodiment is illustrated in FIGS. 10-14. An electrical box 1000 comprises a back portion 1010 and a sliding ring portion 1020 that is slidably coupled to back portion 1010. In typical use, electrical box 1000 is mounted to a wooden or metal wall stud using mounting elements 1012 and 1014, which are coupled to back portion 1010.

Back portion 1010 comprises a back wall 1035 and four walls 1004 that extend from the back wall in the proximal direction from the back wall 1035. The four walls 1004 form an interior space 1040 that can be used to house electrical equipment and wiring for use in electrical box 1000. Sliding ring portion 1020 comprises four walls 1006 coupled to each other. Sliding ring portion 1020 is sized and shaped such that sliding ring portion can slide into at least part of back portion 1010. Sliding ring portion 1020 is configured to slide relative to back portion 1010 on an axis perpendicular to the back wall 1035 of back portion 1010. To simplify withdrawal of the sliding ring portion 1020 from the interior space 1040 of the back portion 1010, particular implementations may comprise one or more notches 1008 in the side walls 1004 of the back portion 1010 to form a grip space in a front side of one or more side walls 1004 of the back portion 1010.

Figure 10:
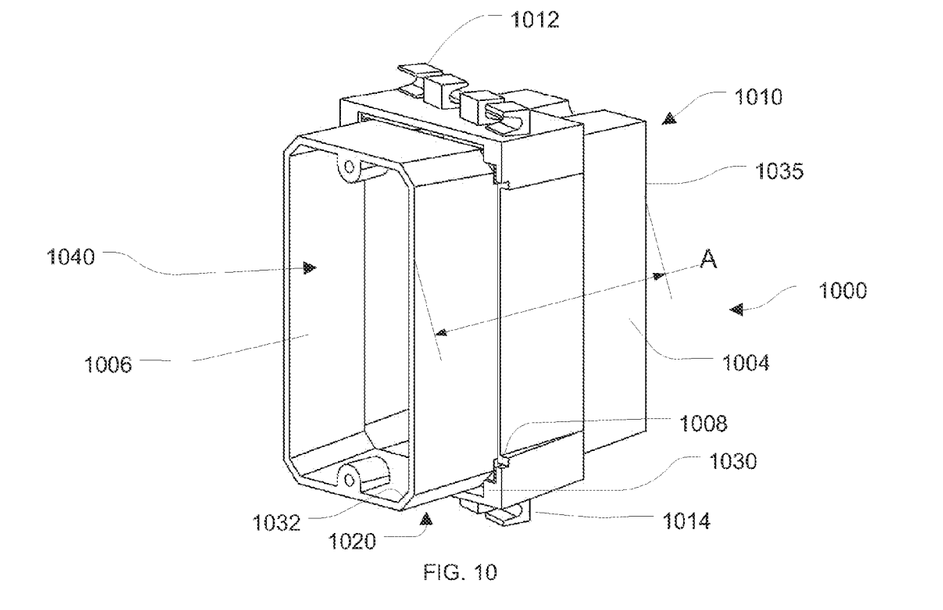
FIG. 10 is an isometric view of another implementation of an electrical box.
Figure 11:
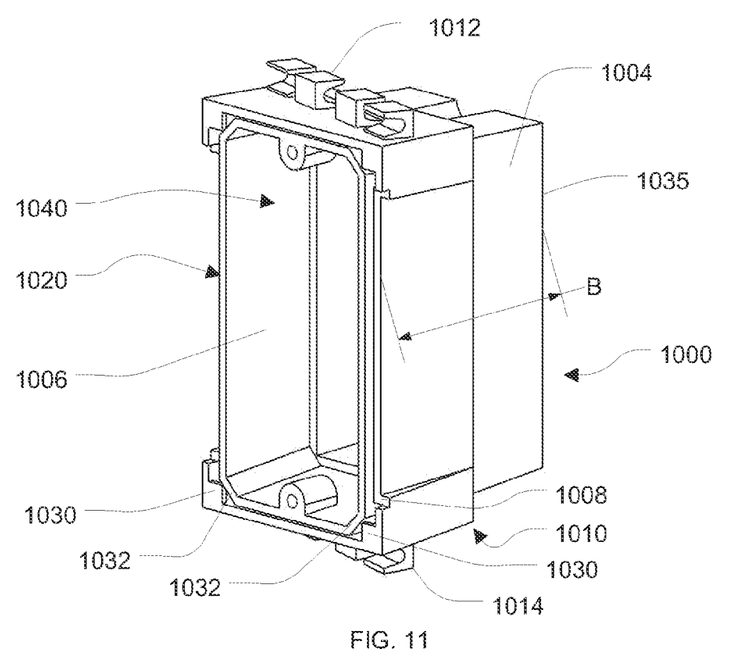
FIG. 11 is an isometric view of the electrical box of FIG. 10 in a collapsed position.
Figure 12:
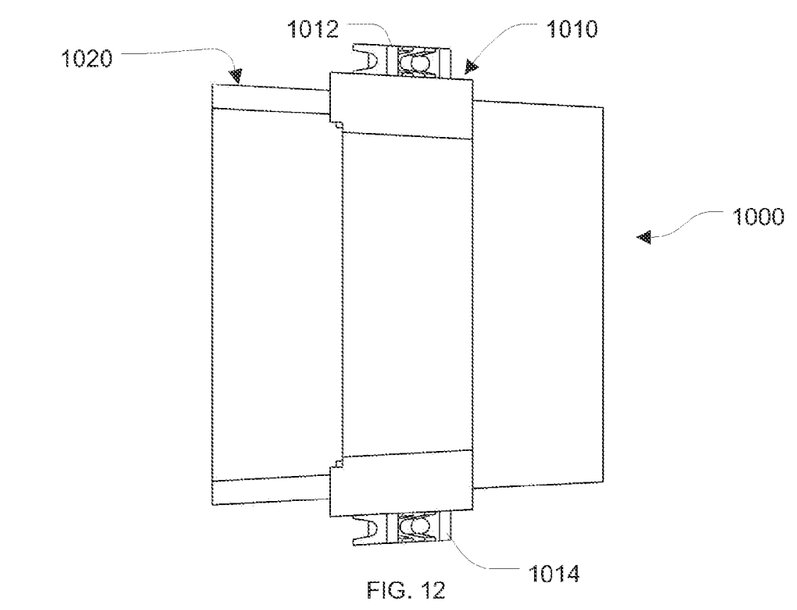
FIG. 12 is a side view of the electrical box of FIG. 10 in an extended position.
Figure 13:
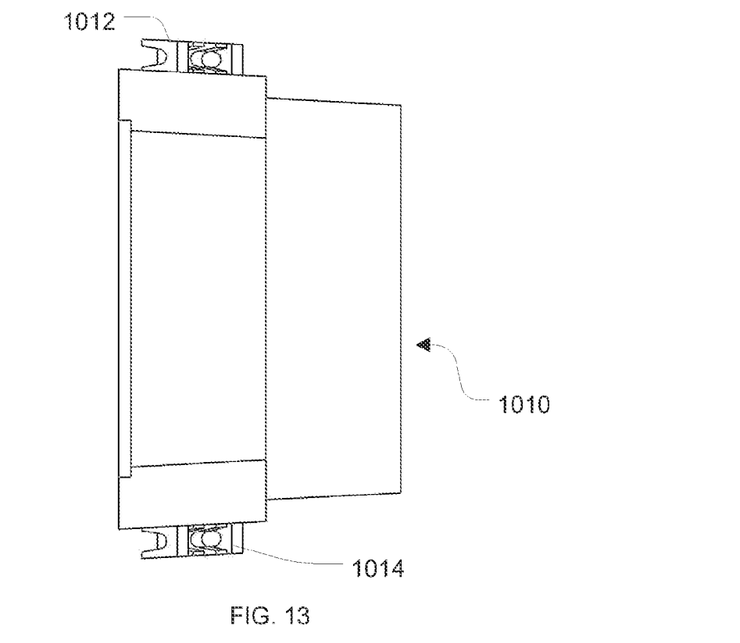
FIG. 13 is a side view of the electrical box of FIG. 10 in a collapsed position.

Sliding ring portion 1020 has two main positions with respect to back portion 1010, an extended position with a depth A, shown in isometric view in FIG. 10, and a collapsed position with a depth B, shown in isometric view in FIG. 11. Depth A is greater than depth B. Depth A is comparable to the depth of electrical boxes now known in the art, such that, when the electrical box is installed, in the extended position, the functionality of electrical box 1000 is unaffected by the collapsibility.

The coupling between back portion 1010 and sliding ring portion 1020 may be accomplished in any manner known in the art. For example, there may be one or more tracks 1030 formed on back portion 1010. The tracks may comprise a groove, channel, furrow, path, ledge, raised track, and/or the like and may be formed integrally or may be formed separately and thereafter coupled to the back portion 1010. These tracks 1030 may be in mechanical cooperation with one or more guides 1032 that are located on the outside surface of sliding ring portion 1020. The guides 1032 may comprise any projection, protrusion, bump, and/or the like and may be formed integrally or may be formed separately and thereafter coupled to the back portion 1010. The tracks 1030 may be in mechanical cooperation with one or more guides 1032 that are located on the outside surface of sliding ring portion 1020.

Like with the embodiment of FIGS. 1-4, electrical box 1000 may also include a mechanism to secure sliding ring portion 1020 in a particular extended or collapsed position. The same or similar structures as those described with reference to FIGS. 1-4 may be incorporated into this particular embodiment as well.

Figure 14:
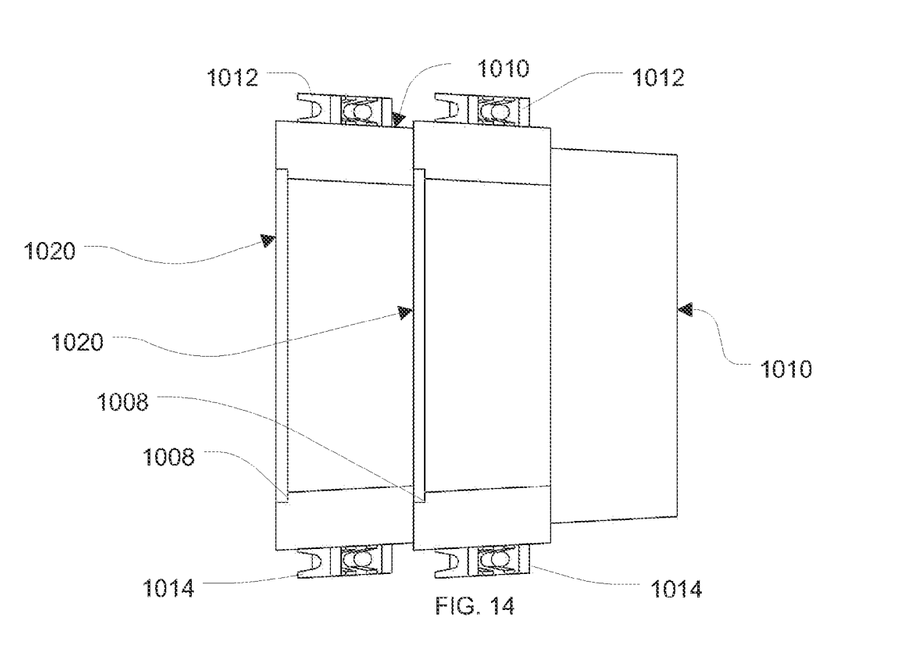
FIG. 14 is a side view of two electrical boxes of FIG. 12 nested together, each in collapsed positions.

In the collapsed position, an electrical box 1000 can be stacked inside another electrical box as illustrated in FIG. 14. On the right side of FIG. 14 is a back portion 1010 of a first electrical box. Coupled to back portion 1010 are mounting elements 1012 and 1054. Slidably mounted within back portion 1010 is an sliding ring portion 1020. Placed within the sliding ring portion 1020 and the back portion 1020 of the first electrical box is the back portion 1020 of a second electrical box. Coupled to back portion 1010 are mounting elements 1012 and 1014. Slidably located within back portion 1010 of the second electrical box is an inner sliding ring portion 1020 of the second electrical box.

Like with previous embodiments, it is readily apparent that the nested electrical boxes shown in FIG. 14 occupy much less space than traditional electrical boxes would. Approximately two electrical boxes will occupy approximately the same amount of space that one traditional electrical box, meaning that almost twice as many electrical boxes can be placed in a box intended for shipment.

For any of the embodiments described herein, by providing a sliding ring that is approximately equal to about half of the depth of the back portion allows the electrical box to collapse to approximately ⅔rds its operating size. By further sizing the back portion of the wall to fit within both the open front of the back portion of another electrical box and the sliding ring associated with that other box, the storage of two of the electrical boxes is approximately half of previous storage space, and stacking of greater numbers of boxes together further increases that ratio such that, for example, approximately eleven electrical boxes can store in the space that only four could previously be stored in.

It will be understood that implementations are not limited to the specific components disclosed herein, as virtually any components consistent with the intended operation of a method and/or system implementation for an electrical box may be utilized. Accordingly, for example, it should be understood that, while the drawing figures accompanying text show and describe a rectangular electrical box, an electrical box of the present invention may contain any number of sides. Common electrical box shapes also include round, square, and octagonal. However, an electrical box of the present invention may also be other shapes. Components may comprise any shape, size, style, type, model, version, class, grade, measurement, concentration, material, weight, quantity, and/or the like consistent with the intended operation of a method and/or system implementation for an electrical box.

The concepts disclosed herein are not limited to the specific implementations shown herein. For example, it is specifically contemplated that the components included in a particular implementation of an electrical box may be formed of any of many different types of materials or combinations that can readily be formed into shaped objects and that are consistent with the intended operation of an electrical box. For example, the components may be formed of: rubbers (synthetic and/or natural) and/or other like materials; polymers and/or other like materials; plastics, and/or other like materials; composites and/or other like materials; metals and/or other like materials; alloys and/or other like materials; and/or any combination of the foregoing.

Furthermore, embodiments of the electrical box may be manufactured separately and then assembled together, or any or all of the components may be manufactured simultaneously and integrally joined with one another. Manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled or removably coupled with one another in any manner, such as with adhesive, a weld, a fastener, any combination thereof, and/or the like for example, depending on, among other considerations, the particular material(s) forming the components.

In places where the description above refers to particular implementations of an electrical box, it should be readily apparent that a number of modifications may be made without departing from the spirit thereof and that these implementations may be applied to other electrical boxes. The accompanying claims are intended to cover such modifications as would fall within the true spirit and scope of the disclosure set forth in this document. The presently disclosed implementations are, therefore, to be considered in all respects as illustrative and not restrictive, the scope of the disclosure being indicated by the appended claims rather than the foregoing description. All changes that come within the meaning of and range of equivalency of the claims are intended to be embraced therein.

The invention claimed is:

1. An electrical box assembly comprising:
    a back portion comprising at least four sides extending forward from a back wall to an open front;
    a sliding ring portion slidably coupled to the back portion and slidable with respect to said open front and sides between an expanded position at a first depth and a collapsed position at a second depth less than the first depth, the sliding ring comprising at least four walls extending between an open back and an open front of the sliding ring portion, the open front of the sliding ring portion sized larger than the back wall of the back portion;
    at least one wall mounting structure for mounting the electrical box assembly; and
    at least two box mounting screw apertures adjacent to each of at least two sides of the sliding ring portion, each box mounting screw aperture comprising an opening extending toward the open front of the sliding ring portion.

2. The electrical box assembly of claim 1, wherein the sliding ring portion is slidably mounted to the back portion on an external wall surface of the back portion.

3. The electrical box assembly of claim 1, the back portion further comprising at least one track on an internal surface of the back portion, the sliding ring portion further comprising at least one corresponding guide on an internal surface of the sliding ring portion.

4. The electrical box assembly of claim 3, wherein the mounting structure is fixedly coupled to the sliding ring portion.

5. The electrical box assembly of claim 4, further comprising a locking tab coupled to the back portion and configured to resist movement of the sliding ring portion from the extended position.

6. The electrical box assembly of claim 1, wherein the sliding ring portion is slidably mounted to an internal surface of the back portion.

7. The electrical box assembly of claim 1, further comprising:
    at least one grooved track on an external surface of at least one of said sides of the back portion and extending towards the open front of the back portion; and
    at least one guide on an internal surface of the sliding ring portion sized to fit within the at least one grooved track of the back portion.

8. A system of electrical boxes comprising:
    first and second collapsible electrical boxes each comprising:
    a back portion comprising at least four sides extending from a back wall to an open front of the back portion, and at least two tracks, each track extending at least partially between the back wall and the open front on opposing sides of the at least four sides;
    a sliding ring portion slidably coupled to an exterior surface of the sides of the back portion and slidably moveable between an expanded position comprising a first depth and a collapsed position comprising a second depth less than the first depth, the sliding ring portion comprising at least four walls extending between an open front and an open back of the sliding ring portion, and having at least two guides, each of said guides protruding from an opposing wall of the four walls sized to engage with a different track of the at least two tracks, and the open front of the sliding ring portion sized larger than the back wall of the back portion such that each of the first and second collapsible electrical boxes is capable of partially nesting within the other of the first and second collapsible electrical boxes;
    at least one wall mounting structure coupled to at least one side wall of the back portion or the sliding ring portion; and
    at least two box mounting screw apertures adjacent to each of at least two sides of the sliding ring portion, each box mounting screw aperture comprising an opening extending toward the open front of the sliding ring portion.

9. The system electrical boxes of claim 8, wherein each of the sliding ring portions of each of the first and second collapsible electrical boxes is slidably mounted on an external wall surface of the respective back portion.

10. The system electrical boxes of claim 9, wherein the at least one wall mounting structure of each of the first and second collapsible electrical boxes is coupled to the respective sliding ring portion.

11. The system electrical boxes of claim 9, wherein each of the sliding ring portions of each of the first and second collapsible electrical boxes is slidably mounted to an internal surface of the respective back portion.

12. The system electrical boxes of claim 11, wherein each track comprises a grooved track extending toward the open front and each of said guides is sized to fit within one of the tracks of the respective back portion when the first and second collapsible boxes are partially nested.

13. An electrical box assembly, comprising:
an electrical box comprising a back portion, and at least four walls extending from a back wall to an open front;
a sliding ring portion is slidable within the back portion and slidable between an expanded position comprising a first depth and a collapsed position comprising a second depth less than the first depth, the sliding ring comprising at least four walls extending between an open front and an open back of the sliding ring portion, the open front of the sliding portion sized larger than the back of the back portion;
a wall mounting structure coupled to at least one side wall of the back portion; and
at least two box mounting screw apertures adjacent to each of at least two sides of the sliding ring portion.

14. The electrical box assembly of claim 13, wherein at least two opposing walls of the at least four walls of the back portion coverage toward said back wall.

15. An electrical box assembly, comprising:
a back portion comprising at least four sides extending from a back wall to an open front and at least two tracks each on opposing sides of the at least four sides;
a sliding ring portion slidably coupled to an exterior surface of the back portion and slidable with respect to said sides and said open front between an expanded position comprising a first depth and a collapsed position comprising a second depth less than the first depth, the sliding ring portion comprising at least four walls extending between an open front and an open back of the sliding ring portion, and having at least two guides, each of said guides protruding from an opposing wall of the four walls configured to engage with a respective track of the at least two tracks;
a wall mounting structure coupled to at least one of said four walls or at least one wall of the four walls of the sliding ring portion; and
at least two box mounting screw apertures, each box mounting aperture extending at least partially into a different guide on the sliding ring portion.

16. The electrical box assembly of claim 15, wherein each of the at least two guides protrudes inwardly from the sliding ring portion and each of the at least two tracks comprise inwardly grooved tracks.

17. The electrical box assembly of claim 16, wherein the wall mounting structure is coupled to at least one of said sides of the back portion.

18. The electrical box assembly of claim 17, wherein a portion of the sliding ring portion abuts the wall mounting structure when the sliding ring is in the collapsed position.

19. The electrical box assembly of claim 18, further comprising a locking tab configured to at least partially restrict sliding of the sliding ring.

20. The electrical box assembly of claim 15, wherein the wall mounting structure is fixedly coupled to the sliding ring portion.

* * * * *